Feb. 27, 1945.  E. BRAMSON  2,370,121
EGG CANDLING APPARATUS
Filed Aug. 28, 1942  3 Sheets-Sheet 1
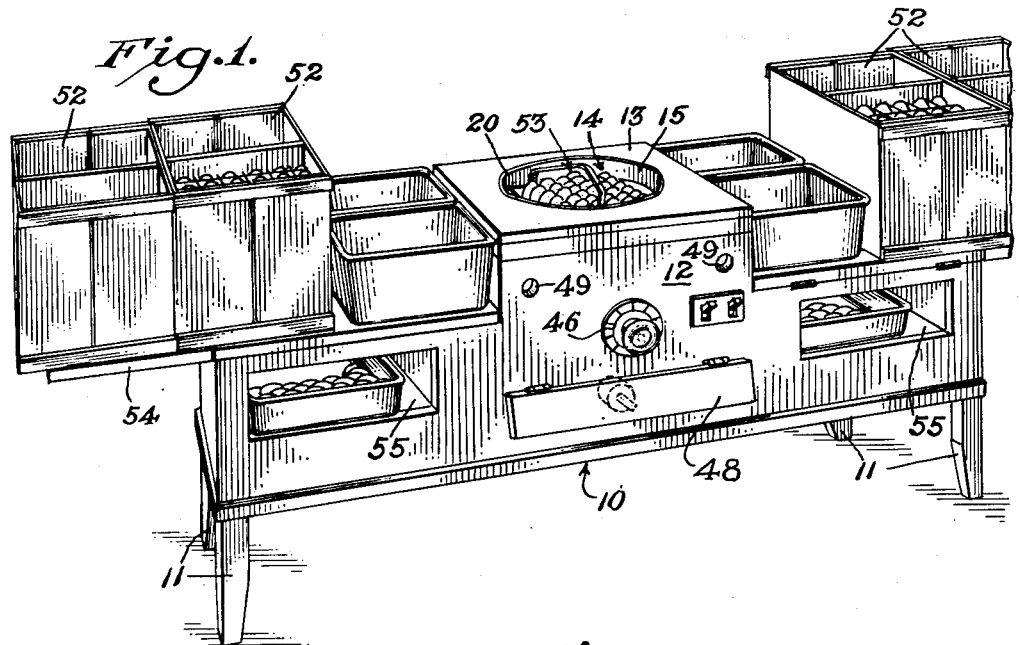
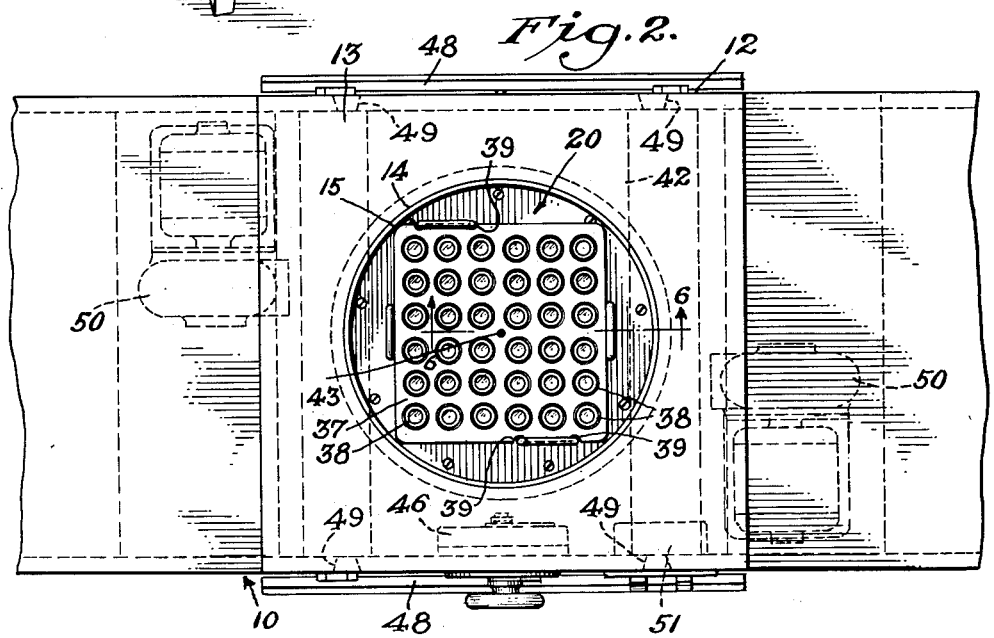
Inventor
Ely Bramson
BY Parker, Carlson, Pitzner & Hubbard
Attorneys.

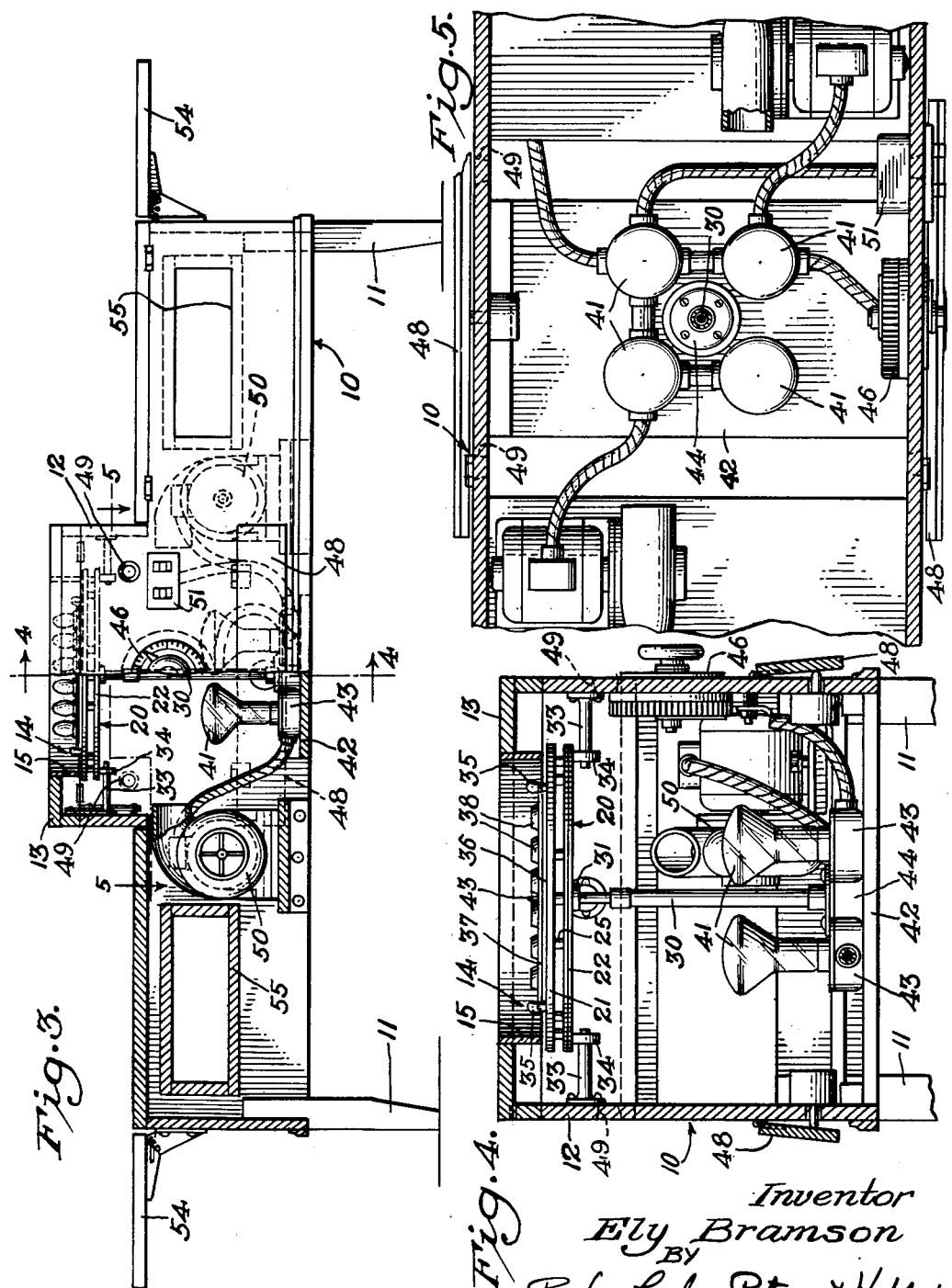

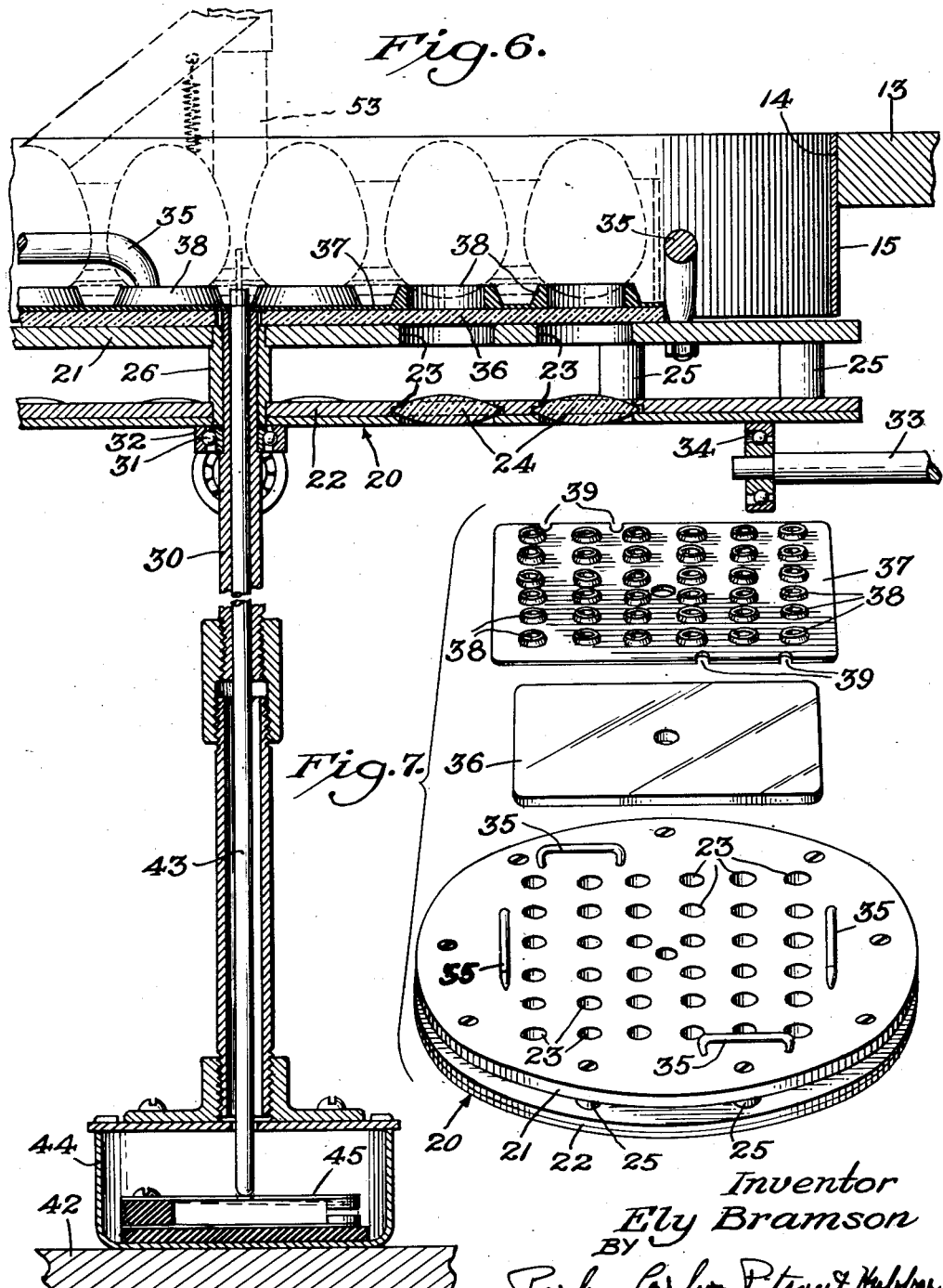

Patented Feb. 27, 1945

2,370,121

UNITED STATES PATENT OFFICE 2,370,121

EGG CANDLING APPARATUS

Ely Bramson, Chicago, Ill., assignor to Bramson Manufacturing Company, Inc., Chicago, Ill., a corporation of Illinois Application August 28, 1942, Serial No. 456,506

11 Claims. (Cl. 88—14.8)

My invention relates to egg candling apparatus and aims to provide an improved apparatus of the turntable type for use in candling a lot of eggs at one time.

The invention will be best understood by reference to an illustrative embodiment thereof shown in the accompanying drawings, in which:

Figure 1 is a perspective view on a reduced scale of an egg candling apparatus of one practicable construction embodying the features of the invention.

Fig. 2 is a fragmentary plan view of the apparatus.

Fig. 3 is a front elevational view, partially in section, of the apparatus.

Fig. 4 is a vertical sectional view taken on the line 4—4 of Fig. 3.

Fig. 5 is a fragmentary horizontal sectional view taken on the line 5—5 of Fig. 3.

Fig. 6 is a fragmentary vertical sectional view on an enlarged scale taken on the line 6—6 of Fig. 2.

Fig. 7 is a perspective view showing certain parts of the apparatus disassembled.

The illustrative apparatus is designed for use in candling a filler lot of eggs, i. e., such a lot as constitutes one layer of eggs in a compartment of a standard commercial shipping case or egg crate. The apparatus comprises a turntable for supporting such a lot of eggs for candling, by rotation of which the lot can be turned to permit viewing the illuminated eggs from various sides, and a housing cooperating with the turntable not only to enclose the illuminating means and to shield the eggs from light therefrom other than that which passes through the eggs but also to provide a well in which the lot is contained while being candled. In the specific form shown, the housing is embodied in a horizontally elongated box-like structure 10 supported on legs 11 and having a central raised portion 12 with a removable flat top wall 13 in which is a circular opening 14. The turntable, designated as a whole by the numeral 20, is mounted in said central raised portion of the housing for rotation about an axis centered with respect to said opening 14. Mounted in the housing under the turntable is illuminating equipment comprising a plurality of electric lamps 41 for casting light upward. The turntable is provided with apertures over which the eggs are seated and through which light for illuminating the eggs passes from the illuminating means. It will be understood that the turntable shields the eggs from direct light from the illuminating means other than that which passes through said light apertures and through the eggs seated thereover. As best shown in Figs. 2 and 6, the egg seats 38 on the turntable correspond in number and arrangement to the eggs of a filler lot as they stand in a crate compartment, the center of the whole lot of egg seats being at about the axis of rotation of the turntable. The eggs stand on end on said seats, as indicated in Figs. 3 and 6. The housing opening over the turntable is substantially closed by the turntable, the wall of said opening being that of a well the bottom of which is provided by the upper side of the turntable (Fig. 6). In the specific construction shown, said wall of said housing opening is provided by an annular light shielding member 15 fitted in the opening 14 in the top wall member 13 and depending as a flange from the margin of said opening 14. The peripheral portion of the turntable underlies and is closely adjacent to said flange or annular member 15 which thus shields the eggs on the turntable from indirect light from the lamps.

As shown in Figs. 1 and 2 the housing member 13 provides a flat table top surrounding the well opening, which is of a diameter only slightly greater than the diagonal of the square occupied by the lot of eggs on the turntable. The depth of the well is such that the eggs when standing on their seats on the turntable are substantially wholly within the well (Fig. 6). As shown, the well is of such depth that the eggs as supported for candling stand with their upper ends at about or near the level of the top of the well. Thus the illuminated eggs are advantageously exposed for observation, and are conveniently accessible in case the operator should desire to pick up or to finger any individual egg, while the eggs are shielded from transverse rays from light external to the apparatus, for prevention or minimization of the casting of transverse shadows by or upon the eggs. Assuming the apparatus to be used in semi-darkness or in a room only dimly lighted from a source at an appropriate distance from the apparatus and not shining directly upon the eggs, there will be substantially no interference with illumination by the casting of transverse shadows from light external to the apparatus.

For condensing the light which passes through the light apertures of the turntable to the eggs seated thereon, the turntable is shown equipped with a set of lenses 24, one under each egg seat (Fig. 6). In the form shown the turntable comprises an upper member 21 and a lower member 22 in spaced relation to each other and having vertically alined light apertures 23. Said members are provided by opaque plates. The plates are preferably made of some plastic material such as Formica which is completely opaque and which may be very readily cleaned. The lenses 24 are carried by the lower plate or member 22. As shown, the lenses are mounted in said lower member in the light apertures thereof. To support the lenses 24, the lower member 22 of the turntable is of two-part construction as shown so that each lens may be clamped at its periphery between the two parts. The upper and lower members 21 and 22 are held in spaced relation at their periphery by spacers 25 to which the upper and lower members 21 and 22 may be secured as by screws. At their center the upper and lower members are preferably secured to a hub 26.

The turntable is rotatably supported, and to this end it is preferably mounted on a fixed centerpost 30 extending upwardly within the housing 10, the hub 26 of the turntable fitting over the upper end of the post 30. To make the turntable readily rotatable, an antifriction bearing such as a ball bearing 31, is fixed on the upper end of the centerpost 30 and the turntable when mounted on the centerpost rests on the outer race 32 of the ball bearing. Thus the turntable may be easily rotated. As further support for the turntable, and particularly the periphery thereof, rollers are provided. Thus, while the rollers could be mounted either in the housing or on the turntable, preferably the housing is provided with a plurality of rods 33 extending radially under the turntable at the periphery thereof and secured to the walls of the housing. On the free or inner ends of the rods 33 are mounted anti-friction bearings such as ball bearings 34 which serve as rollers on which the periphery of the turntable rests. In the preferred form, four such rollers are provided. Thus, while the turntable is free to rotate, it is prevented from canting or tilting by peripheral rollers 34.

To permit the operator to readily rotate the turntable a plurality of handles 35 are mounted on the upper side of the upper member 21 of the turntable so that any one of them may be readily grasped to rotate the turntable, these handles being within the well in which the eggs are contained while being candled.

One of the features of the apparatus is a construction such that it may be readily kept clean. In buildings where eggs are being handled there is considerable dust, and also occasionally eggs are accidentally broken in handling. To prevent such dust and drippings from broken eggs from readily getting inside of the apparatus, and particularly from getting onto the lenses 24, which should be kept clean to give the full benefit of the light, a transparent plate such as a glass plate 36 is laid on the opaque plate 21 of the turntable. This transparent plate permits the passage of light therethrough while preventing dirt and drippings from falling through the light apertures 23. To support the eggs above the apertures 23, cushioning means such as a rubber mat 37 is provided to overlie the glass plate 36. The rubber mat 37 is formed with light apertures in registration with the apertures 23 and with raised annular bosses 38 on which the eggs are seated.

The glass plate 36 and the rubber mat 37 are removable, as illustrated in Fig. 7, so that they may readily be kept clean. In order to facilitate properly placing them on the turntable, the four handles 35, by which the turntable is turned, are arranged at the four sides of a square to serve as locating means for both the glass plate 36 and the rubber mat 37. Thus the glass plate and rubber mat may be removed, and when put back in place may be easily positioned to aline the apertures in the rubber mat with the apertures 23 in the members 21 and 22 of the turntable. If desired, the rubber mat may be slightly larger in one or both of its dimensions than the space between opposite handles 35 and have notches 39 cut in its edge to fit around the handles.

As mentioned above, illuminating means is provided within the housing 10 for directing light upwardly through the apertures 23 and onto the eggs. Preferably such illuminating means comprises a plurality of electric lamps 41 (see Figs. 3, 4, and 5). To support the lamps, a cross brace 42 is mounted in the lower part of the housing 10 and on the cross brace are positioned lamp bases 43. The lamps 41 are preferably placed in regular arrangement about the centerpost 30, four such lamps being shown herein, so that light will be distributed uniformly through all of the apertures 23 of the turntable. The lamps 41 are preferably of the type which are manufactured for flood lighting. It has been found that an amber light makes the differences between good and bad eggs more apparent. Therefore the lamps in the present instance are colored amber, at least on their top portions through which the light radiates to the apertures 23. However, in the case of testing partially incubated eggs, a blue or green color is preferred.

It is desirable to have the lamps extinguished except during candling. Provision is made for convenient control of the electric circuit for the lamps by the operator, and also for automatic control to give illumination only as an incident to placing the eggs in position for candling. Means for such automatic control is as follows: The centerpost 30 is tubular and within it is mounted a rod 43 (see Fig. 6) extending from a point slightly above the turntable downwardly into a box 44. The box 44 preferably is mounted on the cross brace 42 and constitutes a base for the centerpost 30. Within the box 44 is a spring switch 45 controlling the lights. Thus when the rod 43 is depressed, the switch is closed and the spring of the switch is sufficient not only to open it, but also to raise the rod 43 when no weight is placed on the rod. The eggs may be placed on the seats therefor on the turntable while contained in a transfer tray hereinafter referred to and indicated in dotted lines on Fig. 6, and the rod is adapted to be depressed by the weight of such tray. Thus the illuminating means will operate when the eggs contained in such tray are in place to be candled.

As a further means for controlling the illuminating means, hinged plates 48 may be placed on the front and rear faces of the housing to operate a switch controlling the lights. Such plates are preferably placed at about the height of the operator's knee, so that he can merely bear against the plate 48 to turn on the lights. The electrical circuits are so arranged that either the switches operated by the plates 48 or the switch 45 will turn on the lights.

To permit varying the intensity of the light as may be most advantageous for candling or to suit the particular batch of eggs being candled, a rheostat 46 is included in the electric circuit for the lamps 41. Preferably the rheostat is of the dial type and is mounted on the front wall of the housing 10 with its dial and operating handle located on the front face thereof, as illustrated in Figs. 1, 2, and 4. Thus an operator standing in front of the apparatus and looking down at the eggs may readily control the intensity of the light to suit the particular batch of eggs then being candled.

The lamps 41 produce a considerable amount of heat which would spoil the eggs if subjected to such heat for any period of time, or overheat the machine and the lamps. In order to dispose of the heat, the bottom of the housing 10 is open and because the cabinet or housing is raised above the floor by the legs 11, air may freely circulate within the housing. To further insure circulation of air and maintaining it at a room temperature, draft inducing means may be mounted in the housing, such as one or more electrically operated blowers 50. In the present instance, one blower on each side of the central raised portion of the housing is shown. The motors for the blowers 50 may receive their current supply from the same source as the lamps 41. To manually control the blowers as well as the lamps 41 a switch box 51 may be mounted on the front wall of the housing 10 and provided with switches individually controlling the light and blower circuits.

If desired, the circuit may be so arranged that the lamps cannot operate unless the blowers are operating.

The central raised portion 12 of the housing may, if desired, be provided with apertures 49 in which individual eggs may be placed for candling, if the operator is in doubt as to the state or quality of any individual egg.

As before indicated, the illustrative apparatus accommodates a filler lot of eggs standing in the same spaced relationship as in a standard shipping case compartment. Standard shipping cases are illustrated at 52 in Fig. 1, each case comprising two compartments with the eggs placed in layers in each compartment and suitably cushioned and separated from the others. Each layer of eggs in a compartment of a standard case comprises 36 eggs arranged in a square of six eggs in a row and six such rows. With the illustrative apparatus and use therewith of a loading means or transfer tray such as presently to be described, such filler lots of eggs can be expeditiously candled, one such lot after another.

To facilitate the removal of the eggs from a shipping case to the candling apparatus and thence into another case, loading means is preferably provided. While various types of loading means could be used, for purposes of illustration I have shown a tray, indicated partially at 53 in Figs. 1 and 6, well known in the art. Such a tray comprises pairs of fixed and rotatable spaced transverse bars constituting the bottom of the tray and operable by a portion of the handle thereof. A tray of this type may be placed onto the eggs in one layer in the shipping case and the movable bars rotated to retain the eggs in the tray. The tray, together with the eggs, then may be lifted and placed on the turntable 20. The spacing of the handles 35 on the turntable is such that they serve to properly locate the tray when placed on the turntable.

In the preferred form of the apparatus herein shown, the switch operating rod 43 within the centerpost 30 extends above the turntable a sufficient distance so that it will be contacted and depressed by the tray when the eggs are placed on the turntable, thus closing the light-operating switch 45. With the light from the illuminating means directed upwardly through the lenses 24, the apertures 23 in the upper turntable member 21, the glass plate 36, and onto the eggs, the eggs may be readily viewed to permit the operator to discover any bad ones. Moreover, by rotating the turntable, the operator may view the eggs from all sides so that he will not fail to see any bad spots.

The end portions of the housing 10, being lower than the central raised portion 12, provide adequate shelf space for one or more egg cases on each end. Hinged extensions 54 (shown in Figs. 1 and 3) may be provided on the ends of the housing 10 to enlarge the area of the shelf space. The operator preferably stands in front of the machine adjacent the central raised portion 12 so that he may readily operate the rheostat 46 or the switches 51. Another operator may stand behind the machine to candle eggs at the same time, the two operators alternating in using the turntable. The space within the ends of the cabinet 10 may be provided each with a shelf 55 opening both toward the front and the rear of the apparatus. Such shelves are useful to receive pans in which broken or leaky eggs may be placed, both shelves being accessible to operators working in front or in the rear of the apparatus.

From the foregoing description, it is evident that I have provided a highly practicable, efficient and convenient apparatus for use in candling eggs by the filler lot, permitting use therewith of a transfer tray for expeditious handling of such lots, and by which such lots one after another can be quickly and easily candled under conditions conducive to good handling. The apparatus may be used by one not particularly skilled in the candling of eggs, since by the construction of the apparatus the differences between good and bad eggs are made readily apparent. The illuminating means may be controlled to operate only when the eggs are in candling position so that no excessive heat is generated and there is no loss of electric current. Moreover, the heat is adequately disposed of by means of the blowers within the cabinet 10. The apparatus permits controlling the intensity of the light so that the proper amount of illumination for any batch of eggs may be provided. The rubber mat 37 lying on the glass plate 36 supports the eggs in proper relation while the glass plate prevents any dirt or drippings from broken eggs from falling through the light apertures of the turntable upon the lenses or illuminating means 40. Moreover, the glass plate and rubber mat may be readily removed for cleaning, enabling the apparatus to be readily maintained in clean and efficient condition.

It will be understood that the foregoing description is not intended to limit the invention to the specific embodiment thereof shown and described.

I claim as my invention:

1. Egg candling apparatus comprising, in combination, a housing having an opening in its top wall, a turntable rotatably mounted adjacent to and substantially closing said opening, illuminating means within said housing and below said turntable for directing light upwardly, said turntable being provided with a plurality of apertures to permit the light to pass therethrough, a transparent plate positioned on said turntable to prevent dirt from falling through said apertures and to permit the light to pass upwardly therethrough, an apertured cushioning mat positioned on said plate for supporting the eggs in centered relation with the apertures in the turntable, and a plurality of handles mounted on the upper surface of said turntable to facilitate rotation thereof, said handles being located on said turntable to serve as positioning means for said plate and said mat and also adapted to locate an egg transferring device whereby the eggs may be readily placed over said apertures.

2. Egg candling apparatus comprising, in combination, a housing having an opening in its top wall, a turntable mounted adjacent to and substantially closing said opening to support eggs while being candled, electric illuminating means in said housing below said turntable to illuminate the eggs, a centerpost rotatably supporting said turntable, a normally open switch mounted under said centerpost for controlling the illuminating means, and a member extending through and slidably supported by said centerpost for operating said switch, said turntable adapted to directly support the eggs while contained in a transfer tray holding the eggs with their lower ends protruding below the tray bottom, and said member normally extending above the turntable in position to be engaged and depressed by the tray when placed in proper position upon the turntable, there being means whereby said member is yieldingly urged to such position, the switch being actuated to close by depression of said member.

3. Egg candling apparatus comprising, in combination, a housing having an opening in its top wall, a turntable adjacent to and substantially closing said opening, illuminating means mounted in the lower part of said housing for directing light upwardly to illuminate eggs supported on said turntable, a switch box mounted in the lower part of said housing and containing a spring switch controlling the illuminating means, a hollow centerpost supported by said switch box and rotatably supporting said turntable, and a switch operating rod extending upwardly through said centerpost and normally protruding above the upper side of the turntable, said rod being yieldingly spring-supported and depressible by load or pressure on its upper end for operating said switch.

4. An egg candler comprising a housing having a flat top with a circular opening therein and flanged inwardly therearound to form the wall of a well with its lower end within said housing, a turntable mounted in said housing under and concentric with said opening and forming the bottom of said well and adapted to directly support a lot of eggs therein, said turntable having thereon a set of seats on which to rest said eggs and being apertured through said seats for passage of light to the eggs from subjacent illuminating means, the latter being enclosed by said housing, said turntable and the flange depending from the margin of said opening cooperating to substantially shield the eggs from light from said means other than that which passes to the eggs through the apertures in said seats.

5. An egg candling apparatus comprising, in combination, a housing having a flat top with a circular opening therein and an annular flange depending from the margin of said opening within the housing and forming the wall of a well, a turntable rotatably mounted in said housing under and concentric with said opening and forming the bottom of said well, said opening being of less diameter than the turntable and the peripheral portion of the latter underlying and closely adjacent to the lower end of said flange, said turntable having a set of light apertures and annular seats in registration therewith arranged for supporting a lot of eggs in said well, and means in said housing under the turntable for illuminating the eggs so supported.

6. An egg candling apparatus comprising, in combination, a turntable adapted to directly support a filler lot of eggs arranged as in a crate, said turntable having a set of light apertures and annular seats in registration therewith on which to rest the eggs so arranged, the center of the lot of eggs on said seats being at the axis of rotation of the turntable, means under the turntable for illuminating the eggs, and a housing cooperating with the turntable to enchamber said illuminating means, said housing having a circular top opening concentric with the turntable and an annular light shield fitting said opening and forming the wall of a well the bottom of which is formed by the upper side of the turntable, said well being of a diameter only slightly greater than the diagonal of the square occupied by the lot of eggs on the turntable and of a depth such that the eggs resting on said seats are wholly within the well and stand with their upper ends near the level of the top of said well.

7. In an egg candling apparatus for use with a transfer tray for holding a filler lot of eggs arranged as in a crate and with their lower ends protruding below the tray bottom, the combination comprising a turntable on which to rest said tray, illuminating means thereunder, a housing cooperating with said turntable for enchambering said illuminating means, said housing having a circular top opening substantially closed by and concentric with the turntable, the wall of said opening being that of a well the bottom of which is formed by the upper side of the turntable, said well being of a diameter only slightly greater than the diagonal of the square occupied by the lot of eggs but sufficient to permit placing the tray therein upon the turntable, said turntable having a set of seats arranged to support the eggs so arranged in said tray and means coactive with the tray for locating it in proper relation to said set of seats, the turntable being apertured through said seats for illumination of the eggs by light from said illuminating means, the depth of the well being such that the lot of eggs when standing on said seats are substantially wholly within the well.

8. An egg candling apparatus comprising, in combination, a housing having a circular top opening, a turntable mounted in said housing concentric with said opening and adapted to directly support a lot of eggs therein, said turntable comprising vertically spaced rigidly connected upper and lower plates of opaque material having registering light apertures and light condensing lenses mounted in the apertures of the lower plate, and illuminating means in said housing under the turntable, said opening being substantially closed by the upper one of said plates.

9. An egg candling apparatus comprising, in combination, a turntable comprising a plate of opaque material having a set of light apertures and a transparent plate lying thereon and a superimposed mat of opaque cushioning material having apertures registering with those first mentioned and forming seats for eggs to be candled, said transparent plate and mat being removably held in place, means under said turntable for illuminating the eggs on said seats, and a housing cooperating with said turntable to enchamber said illuminating means, said housing having a circular top opening concentric with said turntable and substantially closed by said first mentioned plate, the wall of said opening being that of a well in which the eggs are supported.

10. An egg candling apparatus comprising, in combination, a turntable, illuminating means thereunder, a housing cooperating with said turntable to enchamber said illuminating means, said housing having a circular top opening concentric with the turntable, the wall of said opening being that of a well the bottom of which is formed by the upper side of the turntable, said turntable comprising an opaque plate having light apertures and a transparent plate lying thereon and a superimposed mat of opaque cushioning material having apertures in registration with those first mentioned and forming egg seats, said transparent plate and mat being removable through said well, and handles within said well affixed to and by which to rotate the turntable, said handles holding said transparent plate and mat in proper position on said opaque plate.

11. In an egg candling apparatus for use with a transfer tray for holding a filler lot of eggs arranged as in a crate and with their lower ends protruding through the tray bottom, a turntable on which to rest said tray adapted to directly support the eggs for candling while in said tray, said turntable having a set of light apertures and seats for supporting the eggs thereover and having means coactive with the tray for locating it in proper relation to the set of seats, a hollow centerpost on which the turntable is rotatably mounted, electric means for illuminating the eggs, a normally open switch controlling the circuit thereof, and a yieldingly spring-supported switch-operating rod slidable in said centerpost and normally protruding above the center of the turntable in a position to be engaged and depressed by the tray when placed in proper position upon the turntable, the switch being closable by depression of said rod.

ELY BRAMSON.